US008499789B2

(12) United States Patent
Seeber et al.

(10) Patent No.: US 8,499,789 B2
(45) Date of Patent: Aug. 6, 2013

(54) MOBILE GAS SUPPLY SYSTEM

(75) Inventors: Manfred Seeber, Gensungen (DE); Gerald Guenzel, Selmsdorf (DE)

(73) Assignee: Tescom Corporation, Elk River, MN (US)

( * ) Notice: Subject to any disclaimer, the term of this patent is extended or adjusted under 35 U.S.C. 154(b) by 488 days.

(21) Appl. No.: 12/467,625

(22) Filed: May 18, 2009

(65) Prior Publication Data

US 2009/0293968 A1 Dec. 3, 2009

Related U.S. Application Data

(60) Provisional application No. 61/057,098, filed on May 29, 2008.

(51) Int. Cl.
*F16K 11/20* (2006.01)

(52) U.S. Cl.
USPC ............................ 137/597; 137/606; 137/613

(58) Field of Classification Search
USPC . 137/597, 606, 613, 487.5, 266, 79; 141/105, 141/236, 237, 244, 285, 301, 302
See application file for complete search history.

(56) References Cited

U.S. PATENT DOCUMENTS

| | | | | |
|---|---|---|---|---|
| 3,047,005 | A * | 7/1962 | Karr | 137/115.02 |
| 4,355,659 | A * | 10/1982 | Kelchner | 137/625.19 |
| 4,489,721 | A * | 12/1984 | Ozaki et al. | 128/205.24 |
| 5,584,289 | A | 12/1996 | Wise | |
| 5,605,173 | A * | 2/1997 | Arnaud | 137/7 |
| 5,673,755 | A * | 10/1997 | Sundholm | 169/16 |
| 2008/0245437 | A1 | 10/2008 | Shige | |

FOREIGN PATENT DOCUMENTS

| | | | |
|---|---|---|---|
| CN | 1946965 | A | 4/2007 |
| CN | 200954321 | Y | 10/2007 |
| WO | WO-0183084 | A1 | 11/2001 |
| WO | WO-2006108041 | A1 | 10/2006 |

OTHER PUBLICATIONS

Search Report for PCT/US2009/044804, mailed Jan. 18, 2010.
Written Opinion for PCT/US2009/044804, mailed Jan. 18, 2010.
Office Action for Chinese Application No. 200980119510.8, dated Mar. 28, 2012.
Office Action for Chinese Patent Application No. 200980119510.8, dated May 15, 2013.

* cited by examiner

*Primary Examiner* — Len Tran
*Assistant Examiner* — Viet Le
(74) *Attorney, Agent, or Firm* — Marshall, Gerstein & Borun LLP

(57) ABSTRACT

A valving arrangement for a mobile gas supply system includes a primary inlet port, a primary outlet port, a regulator, a secondary inlet port, and a secondary outlet port. The primary inlet port is adapted to be connected to a gas cylinder. The primary outlet port is in fluid communication with the primary inlet port and is adapted to be connected to one or more accessories for delivering gas from the gas cylinder. The regulator is disposed between the primary inlet port and the primary outlet port for reducing the pressure of the gas delivered by the gas cylinder to the primary inlet port. The secondary inlet port is in fluid communication with the primary outlet port. The secondary outlet port is in fluid communication with the primary outlet port and the secondary inlet port. The secondary inlet and secondary outlet ports are adapted for connecting the valving arrangement to one or more additional gas cylinders.

25 Claims, 2 Drawing Sheets

MOBILE GAS SUPPLY SYSTEM

CROSS-REFERENCE TO RELATED APPLICATIONS

The priority benefit of U.S. Provisional Patent Application No. 61/057,098, filed May 29, 2008, is claimed and the entire contents thereof are incorporated herein by reference.

FIELD OF THE DISCLOSURE

The present disclosure generally relates to a mobile gas delivery device, and more particularly, to a valve arrangement for a mobile gas delivery device.

BACKGROUND

In emergency medicine, patients often require treatment at a plurality of different locations beginning with the site of an incident, for example, and ending with a stationary care facility such as a hospital. Prior to reaching the stationary care facility, patients are often transported in an ambulance and/or spend time in a temporary care facility such as an emergency room. The combination of these locations can be referred to as the "chain of care," wherein each different location constitutes a link in the chain.

In many situations, medical personnel are required to administer resuscitation or life support gases, such as oxygen, to patients along the entire chain of care. For example, a first responder to the site of an incident may administer oxygen to the patient from an emergency breathing apparatus. Then, once the ambulance arrives, the patient is transferred thereto and administered oxygen from a system carried within the ambulance. Finally, upon reaching an emergency care facility, the patient can be administered oxygen from a more permanent oxygen supply system. Depending on the emergency care facility, the patient may yet again be transferred to a different oxygen supply system when transferred to a stationary care facility. As such, the supply of oxygen to the patient is often interrupted as the patient is transferred between each of the links in the chain of care.

SUMMARY

One aspect of the present disclosure provides a valving arrangement for a mobile gas supply system. The valving arrangement includes a primary inlet port, a primary outlet port, a regulator, a secondary inlet port, and a secondary outlet port. The primary inlet port is adapted to be connected to a gas cylinder. The primary outlet port is in fluid communication with the primary inlet port and is adapted to be connected to one or more accessories for delivering gas from the gas cylinder. The regulator is disposed between the primary inlet port and the primary outlet port for reducing the pressure of the gas delivered by the gas cylinder to the primary inlet port. The secondary inlet port is in fluid communication with the primary outlet port. The secondary outlet port is in fluid communication with the primary outlet port and the secondary inlet port. The secondary inlet and secondary outlet ports are adapted for connecting the valving arrangement to one or more additional gas cylinders.

In one embodiment, the primary inlet port comprises a high-pressure port and the primary outlet port comprises a low-pressure port.

In one embodiment, the regulator is disposed between the primary inlet port and the secondary inlet port, and between the primary inlet port and the secondary outlet port.

In one embodiment, the primary inlet port comprises a high-pressure port and each of the secondary inlet port and the secondary outlet port comprises a low-pressure port.

In one embodiment, each of the secondary inlet port and the secondary outlet port is disposed between the primary inlet port and the regulator.

In one embodiment, each of the primary inlet port, the secondary inlet port, and the secondary outlet port comprises a high-pressure port.

In one embodiment, the valving arrangement further comprises a tertiary inlet port in fluid communication with the primary outlet port and adapted to be connected to an auxiliary supply.

Another aspect of the present disclosure provides a mobile gas supply apparatus comprising a gas cylinder and a valving arrangement. The valving arrangement is connected to the gas cylinder for delivering a gas from the gas cylinder to a user. The valving arrangement comprises a primary inlet port, a primary outlet port, a regulator, a secondary inlet port, and a secondary outlet port. The primary inlet port is adapted to be connected to an outlet of the gas cylinder. The primary outlet port is in fluid communication with the primary inlet port and adapted to be connected to one or more accessories for delivering the gas to the user. The regulator is disposed between the primary inlet port and the primary outlet port for reducing the pressure of the gas delivered by the gas cylinder to the primary inlet port. The secondary inlet port is in fluid communication with the primary outlet port. The secondary outlet port is in fluid communication with the primary outlet port and the secondary inlet port. Each of the secondary inlet port and the secondary outlet port is adapted for connecting the mobile gas supply apparatus to one or more additional gas supply apparatuses.

In one embodiment, the primary inlet port comprises a high-pressure port and the primary outlet port comprises a low-pressure port.

In one embodiment, the regulator is disposed between the primary inlet port and the secondary inlet port, and between the primary inlet port and the secondary outlet port.

In one embodiment, the primary inlet port comprises a high-pressure port and each of the secondary inlet port and the secondary outlet port comprises a low-pressure port.

In one embodiment, each of the secondary inlet and the secondary outlet port is disposed between the primary inlet port and the regulator.

In one embodiment, each of the primary inlet port, the secondary inlet port, and the secondary outlet port comprises a high-pressure port.

In one embodiment, the valving arrangement further comprises a tertiary inlet port in fluid communication with the primary outlet port and adapted to be connected to an auxiliary supply.

In one embodiment, the valving arrangement comprises a one-piece valving arrangement.

Yet another aspect of the present disclosure provides a mobile gas supply system comprising first and second valving arrangements.

The first valving arrangement comprises a first primary inlet port, a first primary outlet port, a first regulator, a first secondary inlet port, and a first secondary outlet port. The first primary inlet port is adapted to receive a first supply of gas. The first primary outlet port is in fluid communication with the first primary inlet port and adapted to be connected to one or more accessories for delivering the first supply of gas to a user. The first regulator is disposed between the first primary inlet port and the first primary outlet port for reducing the pressure of the first supply of gas that is delivered to the first primary inlet port. The first secondary inlet port is in fluid communication with the first primary outlet port. The first secondary outlet port in fluid communication with the first primary outlet port and the first secondary inlet port.

The second valving arrangement comprises a second primary inlet port, a second primary outlet port, a second regulator, a second secondary inlet port, and a second secondary outlet port. The second primary inlet port is adapted to be connected to a second supply of gas. The second primary outlet port is in fluid communication with the second primary inlet port and the first primary inlet port and adapted to be connected to one or more accessories for delivering at least one of the first and second supplies of gas to a user. The second regulator is disposed between the second primary inlet port and the second primary outlet port for reducing the pressure of the second supply of gas that is delivered to the second primary inlet port. The second secondary inlet port is connected to the first secondary outlet port of the first valving arrangement and in fluid communication with the second primary outlet port and the first primary outlet port. The second secondary outlet port is in fluid communication with the second primary outlet port, the second secondary inlet port, and the first primary outlet port.

In one embodiment, the first and second primary inlet ports each comprises a high-pressure port and the first and second primary outlet ports each comprises a low-pressure port.

In one embodiment, the first regulator is disposed between the first primary inlet port and the first secondary inlet and secondary outlet ports, and the second regulator is disposed between the second primary inlet port and the second secondary inlet and secondary outlet ports.

In one embodiment, the first and second primary inlet ports each comprises a high-pressure port and each of the first and second secondary inlet ports and the first and second secondary outlet ports comprises a low-pressure port.

In one embodiment, each of the first secondary inlet port and the first secondary outlet port is disposed between the first primary inlet port and the first regulator, and each of the second secondary inlet port and the second secondary outlet port is disposed between the second primary inlet port and the second regulator.

In one embodiment, each of the first and second primary inlet ports, the first and second secondary inlet ports, and the first and second secondary outlet ports comprises a high-pressure port.

In one embodiment, the first valving arrangement further comprises a first tertiary inlet port in fluid communication with the first primary outlet port and adapted to be connected to an auxiliary gas supply.

In one embodiment, the first and second valving arrangements each comprises a one-piece valving arrangement.

In one embodiment, the mobile gas supply system further comprises a first gas cylinder connected to the first primary inlet port of the first valving arrangement and adapted for delivering the first supply of gas, and a second gas cylinder connected to the second primary inlet port of the second valving arrangement and adapted for delivering the second supply of gas.

In one embodiment, the mobile gas supply system further comprises a container within which the first and second valving arrangements are disposed.

Other features of the disclosure will be apparent from the following detailed description with reference to the attached drawing figures.

DETAILED DESCRIPTION OF THE PREFERRED EMBODIMENTS

Although the following text sets forth a detailed description of numerous different embodiments, it should be understood that the legal scope of the invention is defined by the words of any claims set forth at the end of this document. The detailed description is to be construed as including examples only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this document using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in any claims at the end of this document is referred to herein in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
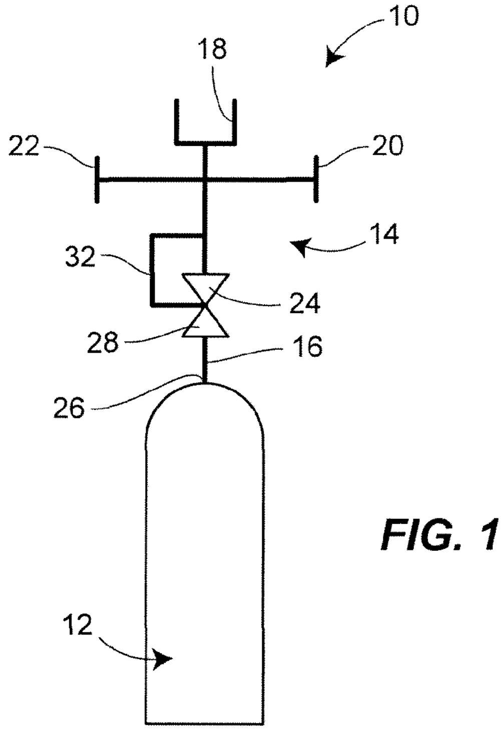
FIG. 1 is a schematic illustration of one embodiment of a mobile gas supply apparatus constructed in accordance with the present disclosure.

FIG. 1 schematically depicts a mobile gas supply apparatus 10 (hereinafter "supply apparatus 10") constructed in accordance with one embodiment of the present disclosure. The supply apparatus 10 includes a gas cylinder 12 and a valving arrangement 14. The gas cylinder 12 can comprise any standard compressed air tank containing compressed oxygen, air, or any other gas. The valving arrangement 14 includes a primary inlet port 16, a primary outlet port 18, a secondary inlet port 20, and a secondary outlet port 22. Additionally, the valving arrangement 12 includes a regulator 24 disposed between the primary inlet port 16 and the other ports, i.e., the primary outlet port 18, the secondary inlet port 20, and the secondary outlet port 22.

The primary inlet port 16 is coupled directly to an outlet 26 of the gas cylinder 12. Thus, the primary inlet port 16 is adapted to receive high pressure from the gas cylinder 12, and as such, can generally be characterized as a high-pressure port. Preferably, the primary inlet port 16 comprises a standard port size that is capable of coupling to the outlet 26 of the gas cylinder 12, which also comprises a standard size described in greater detail below.

The regulator 24 includes one or more generally conventional regulators adapted to regulate the pressure of the gas exiting the gas cylinder 12 in a known manner. The regulator 24 can include, for example, a pressure regulating component 28 and a feedback line 32. The pressure regulating component 28 can include a diaphragm-based regulating component or generally any other type of known fluid regulating component. Therefore, the regulator 24 reduces the pressure of gas exiting the gas cylinder 12 such that gas traveling to the primary outlet port 18 is of a lower pressure than the gas exiting the gas cylinder 12. Accordingly, the primary outlet port 18 can generally be characterized as a low-pressure port. The primary outlet port 18 preferably comprises a standard size that enables it to be coupled to various accessories to be used with the supply apparatus 10. For example, the outlet port 18 is preferably adapted to be coupled to accessories including, but not limited to hose systems, flow meters, flow switches, demand valves for ventilation equipment, ventilators, respirators, masks and cannula, or any other desired accessory or accessories.

The secondary inlet port 20 and the secondary outlet port 22, as mentioned, are disposed opposite the regulator 24 from the primary inlet port 16. As such, the secondary inlet and outlet ports 20, 22 of the disclosed embodiments are adapted to accommodate fluid at the regulated pressure, i.e., a pressure lower than that of the gas that exits the gas cylinder 12. Therefore, similar to the primary outlet port 18 discussed above, the secondary inlet and outlet ports 20, 22 of the present embodiment can generally be characterized as low-pressure ports.

In alternative embodiments, one or both of the secondary inlet and outlet ports 20, 22 can be disposed on the same side of the regulator 24 as the primary inlet port 16. So configured, the secondary inlet and outlet ports 20, 22 could be adapted to accommodate the high pressure fluid exiting directly from the gas cylinder 12. So configured, the secondary inlet and outlet ports 20, 22 could generally be characterized as high-pressure ports. Thus, the present disclosure is not limited to the specific location of the secondary ports 20, 22 relative to the regulator 24. Finally, similar to the primary inlet and outlet ports 16, 18, the secondary inlet and outlet ports 20, 22 include standard port sizes.

Although not illustrated in FIG. 1, in some embodiments, at least one of the primary inlet port 16, the primary outlet port 18, the secondary inlet port 20, and the secondary outlet port 22 includes a check valve for preventing backflow. Additionally, in some embodiments, at least one of the primary inlet port 16, the primary outlet port 18, the secondary inlet port 20, and the secondary outlet port 22 includes a self-sealing fluid port such that additional sealing devices, e.g., o-rings, plumber's tape, e.g., Teflon® tape, etc., are not required. Nevertheless, such additional sealing devices can be used if desired.

In the embodiment depicted in FIG. 1, the above-described components of the valving arrangement 14 can be coupled together with solid plumbing fittings and/or with flexible fluid lines. As such, the valving arrangement 14 disclosed with reference to FIG. 1 constitutes an integral, i.e., one-piece, unit that is easily transportable with or without the gas cylinder 12 attached thereto. Accordingly, it should be appreciated that one advantage of the supply apparatus 10 described herein is that it is easily transportable with a patient along the entire chain of care without interrupting the supply of air to a user.

As mentioned, each of the ports 16, 18, 20, 22 of the valving arrangement 14 are sized according to some predetermined standard. The present disclosure is not limited to any one standard because different jurisdictions can have different standards. Some common standards for high-pressure and low-pressure ports that could be used include, but are not limited to: BS 341, DIN 477, ISO 407, NF E 29-650, NEN 3268, SS (AGA), ITC MIE, UNI 4406, ISO 5145. As such, the use of standard ports enables the supply apparatus 10 disclosed with reference to FIG. 1 to be easily connected for use with standard accessories, standard gas cylinders, etc. Furthermore, the use of standard port sizes enables the valving arrangement 14 to be coupled to generally any available gas cylinder 12 having a standard sized outlet 26. Thus, one advantage of the presently disclosed supply apparatus 10 is that different gas cylinders 12 having different capacities can be used if desired.

Figure 2:
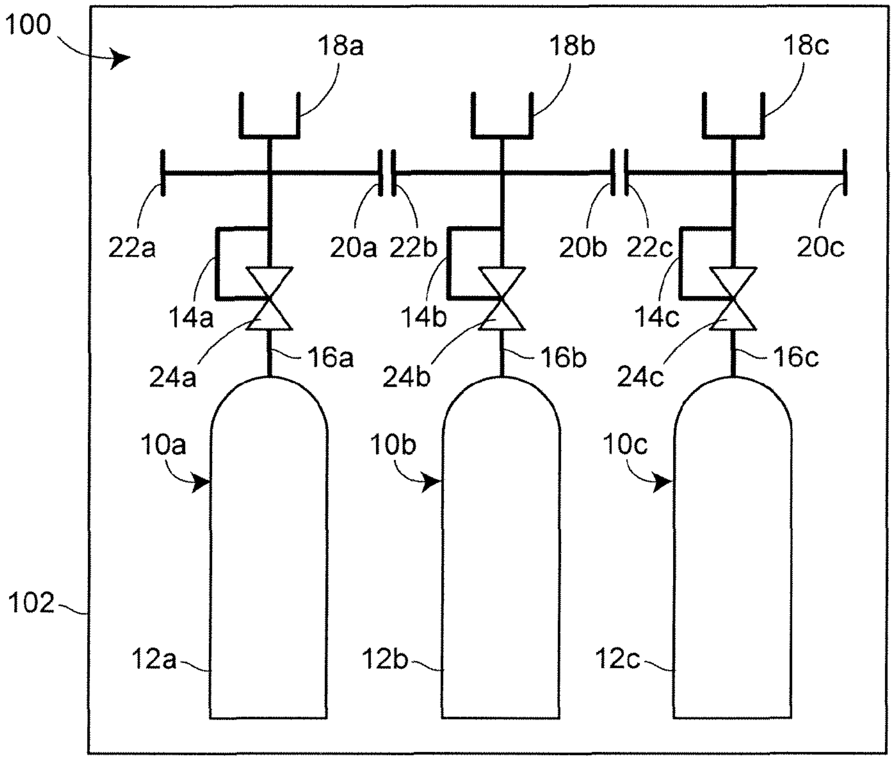
FIG. 2 is a schematic illustration of a mobile gas supply system comprising a plurality of connected mobile gas supply apparatuses constructed as shown in FIG. 1.

A further advantage of the present disclosure includes the ability to couple multiple supply apparatuses 10 together to further increase the capacity of gas. For example, FIG. 2 illustrates one embodiment of a mobile gas supply system 100, which comprises first through third gas supply apparatuses 10*a*-10*c* disposed within a container 102. The container 102 can include a box, a bag, a wheeled cart, a non-wheeled cart, etc. Preferably, each supply apparatus 10*a*-10*c* is individually and removably secured within the container 102 with a conventional securement device such as a strap, a clamp, or other fixation device, as would be known to a person having ordinary skill in the art. As such, the container 102 including the supply apparatuses 10*a*-10*c* is freely mobile and easily transported to provide a continuous and uninterrupted supply of gas to a patient, for example.

Each supply apparatus 10*a*-10*c* includes a corresponding gas cylinder 12*a*-12*c* and valving arrangement 14*a*-14*c*. Each valving arrangement 14*a*-14*c* is identical to the valving arrangement 14 discussed above with respect to FIG. 1. Specifically, each valving arrangement 14*a*-14*c* includes a primary inlet port 16*a*-16*c*, a primary outlet port 18*a*-18*c*, a secondary inlet port 20*a*-20*c*, a secondary outlet port 22*a*-22*c*, and a regulator 24*a*-24*c*.

The supply apparatuses 10*a*-10*c* are connected such that, during use, gas is simultaneously exhausted from each of the gas cylinders 12*a*-12*c* and supplied as desired. More specifically, as illustrated in FIG. 2, the secondary outlet port 22*c* of the third supply apparatus 10*c* is connected to the secondary inlet port 20*b* of the second supply apparatus 10*b*, and the secondary outlet port 22*b* of the second supply apparatus 10*b* is connected to the secondary inlet port 20*a* of the first supply apparatus 10*a*. So configured, gas stored within each of the first through third cylinders 10*a*-10*c* is simultaneously delivered to the corresponding valving arrangements 14*a*-14*c* to supply gas to any accessories that may be connected to any of the primary outlet ports 18*a*-18*c*. For example, in use, any one or all of the primary outlet ports 18*a*-18*c* can be connected to accessories to provide air as desired.

One advantage of this configuration is that multiple patients can simultaneously be administered oxygen, for example, from a single supply system 100. For example, one breathing mask can be connected to each of the three primary outlet ports 18*a*-18*c*, thereby enabling oxygen administration to three patients simultaneously.

Another advantage of this supply system 100 is that it is capable of providing an uninterrupted supply of oxygen to each of the three patients even in the event that they are separated. For example, if the three patients are separated into three different ambulances or onto three different gurneys for transportation, the three supply apparatuses 10*a*-10*c* can simply be disconnected from each other, removed from the container 102, and carried away with the respective patients. Moreover, because the supply apparatuses 10*a*-10*c* are removably secured within the container 102 with standard securement devices, they can easily be re-secured to the ambulance and/or the gurney with standard securement devices.

A still further advantage of the presently disclosed supply system 100 is that an empty gas cylinder 12*a*-12*c* can be replaced without interrupting the supply of gas to one or more patients because the system 100 continuously draws gas from each of the gas cylinders 12*a*-12*c* simultaneously.

In one embodiment of the system 100, one or more of the supply apparatuses 10*a*-10*c* can further be equipped with one or more pressure sensors (not shown) for detecting the pressure supplied by the gas cylinders 12*a*-12*c*, either individually or collectively, and generating a signal that actuates an alarm in the event that the supplied pressure falls below a predetermined minimum pressure. Such an alarm can indicate to a user that one or more gas cylinders needs to be replaced.

Figure 3:
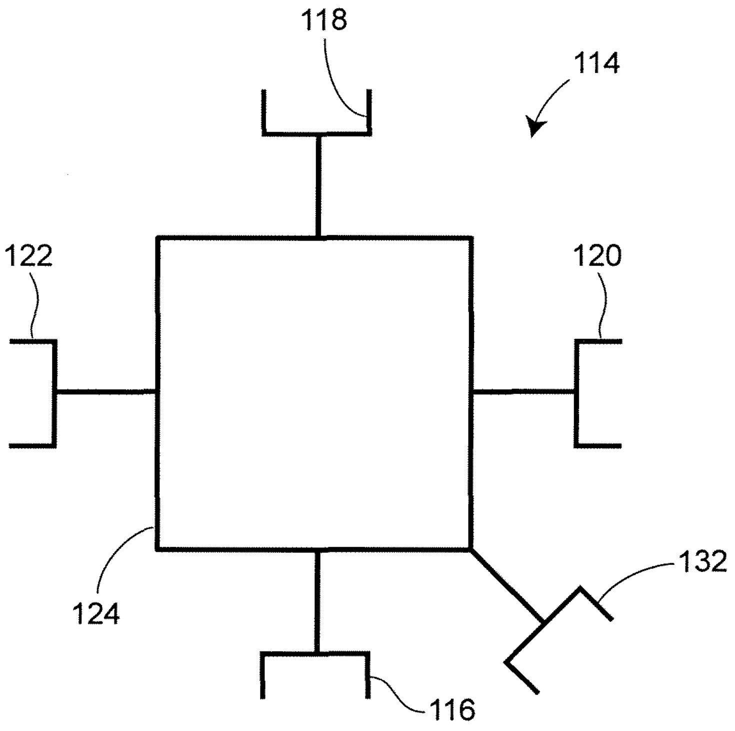
FIG. 3 is an alternative embodiment of a valving arrangement of a mobile gas supply apparatus constructed in accordance with the present disclosure.

While the gas supply apparatus 10 disclosed herein has thus far been described as including a primary inlet port 16 and a secondary inlet port 20, an alternative embodiment of the gas supply apparatus 10 can include a valving arrangement 14 having three or more inlet ports and/or three or more outlet ports. For example, FIG. 3 depicts one alternative valving arrangement 114 including a primary inlet port 116, a primary outlet port 118, a secondary inlet port 120, a secondary outlet port 122, a regulator 124, and a tertiary inlet port 132.

The primary inlet port 116 is adapted to be connected to a gas cylinder (not shown) such as the gas cylinder 12 depicted in FIG. 1, for example. The tertiary inlet port 132 can be connected to an auxiliary supply including, but not limited to, an oxygen concentrator, a central gas supply, a gas cylinder manifold, etc. So configured, a patient's supply of oxygen can be switched from the gas cylinder to an auxiliary supply associated with a care facility such as an ambulance, an emergency room, or a hospital. For example, the auxiliary supply can be connected to the tertiary inlet port 132 to supply gas to the primary outlet 118. Then, with the auxiliary supply connected, the primary inlet port 116 can be disconnected from the gas cylinder. Thus, the inclusion of the tertiary inlet port 132 advantageously enables a patient to be switched between two different sources of oxygen without interrupting the supply of gas.

It should be appreciated that while the system 100 depicted in FIG. 2 includes three separate gas supply apparatuses 10*a*-10*c*, the modularity of the supply apparatuses 10 of the present disclosure enables alternative embodiments of the system 100 to include any number of apparatuses.

Furthermore, while the supply apparatus 10 and system 100 disclosed herein are described as being mobile, and freely transportable, the apparatus 10 and system 100 can advantageously also be used as stationary supplies of oxygen, if desired.

Accordingly, in light of the foregoing, it should be appreciated that the present disclosure provides a modular, easily transportable gas supply apparatus 10, as well as a modular, easily transportable gas supply system 100, capable of supplying one or more patients a continuous and uninterrupted supply of breathable air along an entire chain of care.

We claim:

1. A valving arrangement for a mobile gas supply system, the valving arrangement comprising:

a primary inlet port adapted to be connected to a gas cylinder;

a primary outlet port in fluid communication with the primary inlet port, the primary outlet port adapted to be connected to one or more accessories for delivering gas from the gas cylinder, the primary outlet port including a primary check valve for preventing backflow;

a regulator disposed between the primary inlet port and the primary outlet port for reducing the pressure of the gas delivered by the gas cylinder, the regulator comprising a pressure regulating component and a feedback line, the feedback line having a first end connected to the pressure regulating component and a second end connected to the valving arrangement at a location between the pressure regulating component and the primary outlet port;

a secondary inlet port in fluid communication with the primary outlet port;

a secondary outlet port in fluid communication with the primary outlet port and the secondary inlet port, the secondary inlet and secondary outlet ports adapted for connecting the valving arrangement to one or more additional gas cylinders, the secondary outlet port including a secondary check valve for preventing backflow.

2. The valving arrangement of claim 1, wherein the primary inlet port comprises a high-pressure port and the primary outlet port comprises a low-pressure port.

3. The valving arrangement of claim 1, wherein the regulator is disposed between the primary inlet port and the secondary inlet port, and between the primary inlet port and the secondary outlet port.

4. The valving arrangement of claim 3, wherein the primary inlet port comprises a high-pressure port and each of the secondary inlet port and the secondary outlet port comprises a low-pressure port.

5. The valving arrangement of claim 1, wherein each of the secondary inlet port and the secondary outlet port is disposed between the primary inlet port and the regulator.

6. The valving arrangement of claim 5, wherein each of the primary inlet port, the secondary inlet port, and the secondary outlet port comprises a high-pressure port.

7. The valving arrangement of claim 1, further comprising a tertiary inlet port in fluid communication with the primary outlet port and adapted to be connected to an auxiliary supply.

8. A mobile gas supply apparatus comprising:

a gas cylinder;

a valving arrangement connected to the gas cylinder for delivering a gas from the gas cylinder to a user, the valving arrangement comprising:

a primary inlet port adapted to be connected to an outlet of the gas cylinder;

a primary outlet port in fluid communication with the primary inlet port, the primary outlet port adapted to be connected to one or more accessories for delivering the gas to the user, the primary outlet port including a primary check valve for preventing backflow;

a regulator disposed between the primary inlet port and the primary outlet port for reducing the pressure of the gas delivered by the gas cylinder, the regulator comprising a pressure regulating component and a feedback line, the feedback line having a first end connected to the pressure regulating component and a second end connected to the valving arrangement at a location between the pressure regulating component and the primary outlet port;

a secondary inlet port in fluid communication with the primary outlet port;

a secondary outlet port in fluid communication with the primary outlet port and the secondary inlet port, each of the secondary inlet port and the secondary outlet port adapted for connecting the mobile gas supply apparatus to one or more additional gas supply apparatuses, the secondary outlet port including a secondary check valve for preventing backflow.

9. The mobile gas supply apparatus of claim 8, wherein the primary inlet port comprises a high-pressure port and the primary outlet port comprises a low-pressure port.

10. The mobile gas supply apparatus of claim 8, wherein the regulator is disposed between the primary inlet port and the secondary inlet port, and between the primary inlet port and the secondary outlet port.

11. The mobile gas supply apparatus of claim 10, wherein the primary inlet port comprises a high-pressure port and each of the secondary inlet port and the secondary outlet port comprises a low-pressure port.

12. The mobile gas supply apparatus of claim 8, wherein each of the secondary inlet and the secondary outlet port is disposed between the primary inlet port and the regulator.

13. The mobile gas supply apparatus of claim 12, wherein each of the primary inlet port, the secondary inlet port, and the secondary outlet port comprises a high-pressure port.

14. The mobile gas supply apparatus of claim 8, wherein the valving arrangement further comprises a tertiary inlet port in fluid communication with the primary outlet port and adapted to be connected to an auxiliary supply.

15. The mobile gas supply apparatus of claim 8, wherein the valving arrangement comprises a one-piece valving arrangement.

16. A mobile gas supply system comprising:

a first valving arrangement comprising:

a first primary inlet port adapted to receive a first supply of gas, a first primary outlet port in fluid communication with the first primary inlet port, the first primary outlet port adapted to be connected to one or more accessories for delivering the first supply of gas to a user, the first primary outlet port including a first primary check valve for preventing backflow, a first regulator disposed between the first primary inlet port and the first primary outlet port for reducing the pressure of the first supply of gas, the first regulator comprising a first pressure regulating component and a first feedback line, the first feedback line having a first end connected to the first pressure regulating component and a second end connected to the first valving arrangement at a location between the first pressure regulating component and the first primary outlet port, a first secondary inlet port in fluid communication with the first primary outlet port, and a first secondary outlet port in fluid communication with the first primary outlet port and the first secondary inlet port, the first secondary outlet port including a first secondary check valve for preventing backflow; and a second valving arrangement comprising:

a second primary inlet port adapted to be connected to a second supply of gas, a second primary outlet port in fluid communication with the second primary inlet port and the first primary inlet port, the second primary outlet port adapted to be connected to one or more accessories for delivering at least one of the first and second supplies of gas to a user, the second primary outlet port including a second primary check valve for preventing backflow, a second regulator disposed between the second primary inlet port and the second primary outlet port for reducing the pressure of the second supply of gas, the second regulator comprising a second pressure regulating component and a second feedback line, the second feedback line having a first end connected to the second pressure regulating component and a second end connected to the second valving arrangement at a location between the second pressure regulating component and the second primary outlet port, a second secondary inlet port connected to the first secondary outlet port of the first valving arrangement and in fluid communication with the second primary outlet port and the first primary outlet port, and a second secondary outlet port in fluid communication with the second primary outlet port, the second secondary inlet port, and the first primary outlet port, the second secondary outlet port including a second secondary check valve for preventing backflow.

17. The mobile gas supply system of claim 16, wherein the first and second primary inlet ports each comprises a high-pressure port and the first and second primary outlet ports each comprises a low-pressure port.

18. The mobile gas supply system of claim 16, wherein the first regulator is disposed between the first primary inlet port and the first secondary inlet and secondary outlet ports, and the second regulator is disposed between the second primary inlet port and the second secondary inlet and secondary outlet ports.

19. The mobile gas supply system of claim 18, wherein the first and second primary inlet ports each comprises a high-pressure port and each of the first and second secondary inlet ports and the first and second secondary outlet ports comprises a low-pressure port.

20. The mobile gas supply system of claim 16, wherein each of the first secondary inlet port and the first secondary outlet port is disposed between the first primary inlet port and the first regulator, and each of the second secondary inlet port and the second secondary outlet port is disposed between the second primary inlet port and the second regulator.

21. The mobile gas supply system of claim 20, wherein each of the first and second primary inlet ports, the first and second secondary inlet ports, and the first and second secondary outlet ports comprises a high-pressure port.

22. The mobile gas supply system of claim 16, wherein the first valving arrangement further comprises a first tertiary inlet port in fluid communication with the first primary outlet port and adapted to be connected to an auxiliary gas supply.

23. The mobile gas supply system of claim 16, wherein the first and second valving arrangements each comprises a one-piece valving arrangement.

24. The mobile gas supply system of claim 16, further comprising a first gas cylinder connected to the first primary inlet port of the first valving arrangement and adapted for delivering the first supply of gas, and a second gas cylinder connected to the second primary inlet port of the second valving arrangement and adapted for delivering the second supply of gas.

25. The mobile gas supply system of claim 16, further comprising a container within which the first and second valving arrangements are disposed.

* * * * *

UNITED STATES PATENT AND TRADEMARK OFFICE

CERTIFICATE OF CORRECTION

PATENT NO. : 8,499,789 B2
APPLICATION NO. : 12/467625
DATED : August 6, 2013
INVENTOR(S) : Manfred Seeber et al.

It is certified that error appears in the above-identified patent and that said Letters Patent is hereby corrected as shown below:

In the Specification:

At Column 4, line 49, "arrangement 12" should be -- arrangement 14 --.

At Column 5, line 10, "hose" should be -- those --.

Signed and Sealed this
Twenty-first Day of April, 2015

Michelle K. Lee

Michelle K. Lee
*Director of the United States Patent and Trademark Office*